March 9, 1937.   C. L. FITZ   2,073,368
CAMERA
Filed March 22, 1934   2 Sheets-Sheet 1
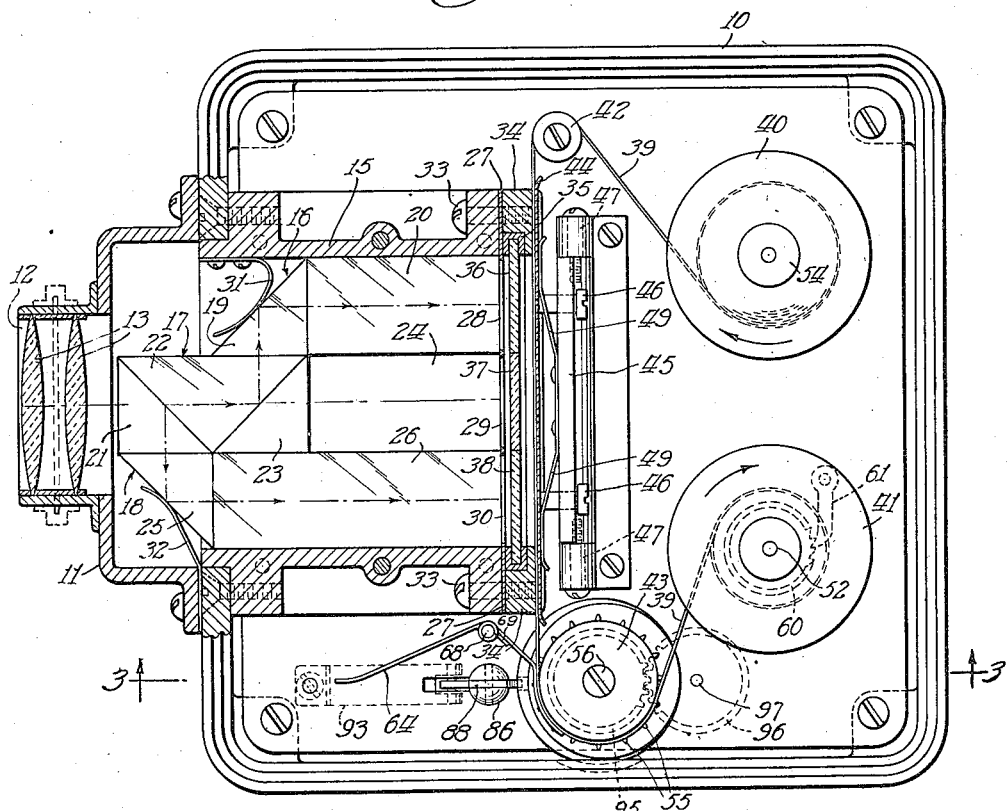
Witness:
V. Silfander
Inventor:
Charles L Fitz
By: Hill + Hill
Attys March 9, 1937.  C. L. FITZ  2,073,368
CAMERA
Filed March 22, 1934  2 Sheets-Sheet 2

Witness:
V. Siljander

Inventor
Charles L. Fitz
By Hill & Hill
Attys

Patented Mar. 9, 1937

2,073,368

UNITED STATES PATENT OFFICE 2,073,368

CAMERA

Charles L. Fitz, Chicago, Ill., assignor to Colortone Corporation, a corporation of Illinois Application March 22, 1934, Serial No. 716,781

9 Claims. (Cl. 95—34)

The invention relates to improvements in cameras and more particularly it relates to improvements in cameras adapted for producing either black and white or color pictures.

It is an object of the invention to provide an improved form of film guiding and actuating mechanisms adapted to accurately advance a film for successive exposures in combination with improved means for registering the number of such successive exposures.

Another object of the invention is the provision of improved film operating means, in combination with improved locking and release mechanism automatically operable to lock said film operating means and to control or limit the maximum amount of film travel for each operation, said mechanism being manually operable to release said means and to permit operation of the mechanism to successively and automatically advance the film.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings wherein like reference characters indicate like or corresponding parts, Fig. 1 is a full size elevational view of a camera embodying the principles of the invention wherein the side wall adjacent to the observer provides a detachable cover which has been removed to show the interior in elevation and the lens and prism housings in section;

Fig. 2 is an elevational view of the lower portion of the camera as observed from the side opposite to that shown in Fig. 1;

Fig. 8 is a view of a disk forming a portion of the registering device when using the camera for taking black and white pictures; and Fig. 9 is a view of an alternate form of gear mechanism adapted for use with the disk shown in Fig. 8.

Figure 3:
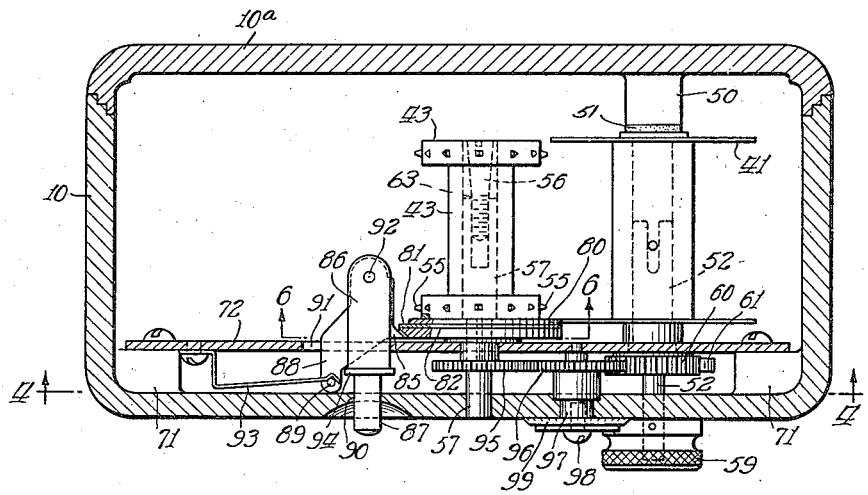
Fig. 3 is a view along the lines 3—3 of Fig. 1.
Figure 4:
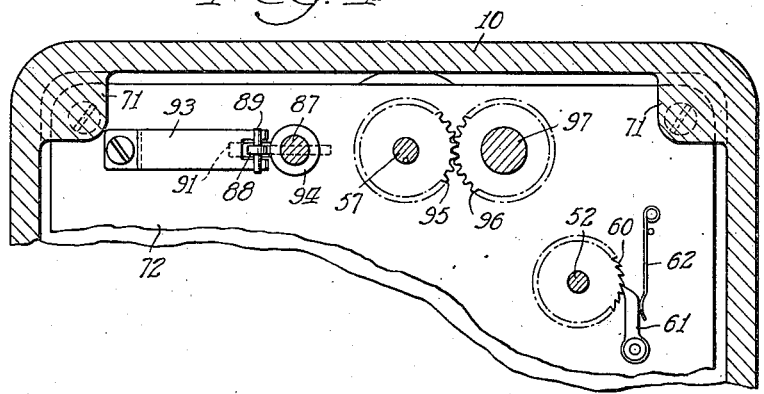
Fig. 4 is a view of a fragmentary portion of the camera taken along the line 4—4 of Fig. 3.

Referring now particularly to the drawings, the principles of the invention are embodied in a camera comprising a housing 10, on the front of which is mounted a lens casing 11, providing a camera aperture 12 and containing a plurality of lenses 13. The casing 11 is mounted on a member 9 providing an enclosure for the outer end of a compound prism block carried by a casing 15.

The prism block comprises three parallel longitudinally extending prism assemblies respectively designated by the numerals 16, 17 and 18. The prism assembly 17 comprises reflecting prisms 21 and 22 and a transmitting prism 23, all of triangular cross section, arranged to provide a rectangular assembly approximately one and one half inches in length. The diagonal faces of the prisms 21, 22, and 23 are inclined at 45° to the longitudinal axis of the assembly, the diagonal face of the prism 21 and the rear diagonal face of the prism 22 being silvered to provide partial reflectors adapted to divide light entering the aperture 12 from the object field.

The prism assembly 16 comprises an outer prism 19 having a triangular cross section, and an inner prism 20 having a rectangular cross section. The prism 19 has its outer diagonal face inclined at 45° to the longitudinal axis of the assembly and its rear face terminating in alignment with the corresponding face of the prism 23. The prism 20 preferably has a length of one and one half inches and the diagonal face of the prism 19 is silvered to provide a complete reflector.

The assembly 18 comprises an outer prism 25 of triangular cross section and an inner prism 26 of rectangular cross section. The outer face of the prism 25 is inclined at an angle of 45° to the longitudinal axis of the assembly and is silvered to provide a complete reflector. The prism 26 is preferably two and one quarter inches long and has its rear face terminating in alignment with the rear face of the prism 20.

The depth of all of the prisms comprising the three assemblies is uniform and preferably ¾ of an inch. The widths of the prisms are preferably one and three eighths inches, that being approximately the width of standard films adapted to be positioned in the camera and exposed to light rays traveling longitudinally through the prism assemblies. The contiguous faces of all of the prisms are fastened together by a thin layer of transparent adhesive material, such for example, as Canada balsam, with the rear faces of the prisms 20 and 26 contacting with an apertured plate 27 mounted on the inner end of the prism housing 15.

Light, coming from the object field and passing through the lenses 13, travels through the prism 21. A portion of the light passing through the prism 21 is reflected by its silvered surface into contact with the total reflecting mirror provided on the diagonal surface of the prism 25, and then travels longitudinally through the prism assembly 18, comprising the prisms 25 and 26. The light which passes through the partially reflecting mirror on the inclined face of the prism 21, travels through the prism 22. A portion of this light is reflected by the partially silvered rear surface of the prism 22, the remainder passing through the prism 23 and the space 24. The light reflected by the silvered surface of the prism 22 strikes the total reflecting silvered surface on the prism 19 and then travels longitudinally through the prisms 19 and 20 comprising the assembly 16. The silvered surfaces, described as providing partial reflectors, are preferably so constructed that the divided light portions respectively passing through the prism assemblies 16, 17 and 18 are in the approximate proportions of 4, 4½ and 8.

The plate 27 provides rectangular apertures 28, 29 and 30, the apertures 28 and 30 being respectively adjacent to the end faces of the rectangular prisms 20 and 26, and the aperture 29 in register with the space 24 between the prisms. The apertures 28, 29 and 30 are preferably of the same size and slightly smaller than the ends of the adjacent prisms. The bounding edges of the apertures 28 and 30 thereby provide frames, leaving uncovered all but a small marginal edge portion of the faces of the adjacent abutting prisms 20 and 26.

The compound block, made up of the prism assemblies 16, 17 and 18, is held against movement in the casing 15 by detent members 31 and 32. The member 31 presses against the adjacent inclined face of the prism 19 and the member 32 similarly presses against the inclined face of the adjacent prism 25, thereby holding the rear faces of the prisms 20 and 26 against the plate 27. The compound prism block may be withdrawn from its mounting in the casing 15 by detaching the member 9 and the detent members 31 and 32.

The apertured plate 27 is fastened to the prism casing 15 by screws 33 extending through the plate into engagement with a frame member 34 providing a mounting for a slide plate 35, carrying filter plates 36, 37 and 38 positioned to respectively cover the apertures 28, 29 and 30.

The film 39 is carried by an upper supply reel 40 and a lower winding reel 41, the intermediate portion of the film passing over an upper roller 42 and underneath a lower sprocket spool 43. The reel 41 is shown as detachably mounted on and rotatable by a shaft 52, and the reel 40 is similarly mounted on a shaft 54. Inwardly projecting lugs 50 on the cover 10a, having strips 51 of felt or other fibrous material pasted thereon, hold the reels 40 and 41 in operative position on their respective shafts 54 and 52 when the cover 10a is in position. A further showing or description of the mounting of the reels 40 and 41 is omitted as being well known in the art.

A portion of the unwound film 39 connecting the roller 42 with the sprocket spool 43, engages the adjacent face of the frame member 34 and is held in contact therewith by a pressure plate 44 carried by a gate member 45. The gate member 45 is swingably mounted on the base plate 72 by means of hinges 47 and is held in closed position by a spring latch 48 not shown. The pressure plate 44 is secured to the middle of the member 45 by a pair of screw bolts 46 adjusted to provide the desired pressure on the portion of the film 39 positioned between the plate and the member 34. The marginal edges of the pressure plate 44 are held in contact with the film 39 by a pair of spring plates 49.

The ends of the sprocket spool 43 provide flanges having teeth 55 accurately spaced to enter and fill the usual marginal apertures or perforations with which films are commonly provided. The film 39 is advanced for successive exposures back of the prism block by rotating the reel 41 clockwise as observed in Fig. 1 to wind the film on the reel, this being accomplished by manual manipulation of a knob 59 on the projecting end of the shaft 52. Rotation of the reel 41 in the opposite direction is prevented by a ratchet wheel 60 fixedly mounted on the shaft 52 and engageable by a pawl 61 held in operative position by a spring plate 62.

The described rotation of the reel 41 causes the sprocket spool 43 to rotate as the film 39 is wound upon the spool 41. A pair of bars 64 mounted on a pivot 68 and having one end curved as shown to engage the adjacent marginal edge of the film 39, hold the film in close contact with the flanged ends of the sprocket spool 43. A spring 69 mounted on the pivot 68 yieldingly holds the shoes or bars 64 in operative position, in which position of the film 39, the teeth 55 prevent the film from slipping on the sprocket spool 43. The flanged edges of the sprocket spool 43 have a circumference of exactly three inches, corresponding to the length of film section utilized in each exposure and, as a result, each successive exposure of the film requires that the sprocket spool be rotated exactly one complete revolution. The sprocket spool 43 is mounted on and rotates a shaft 57 which projects through the base plate 72 and has its adjacent end journaled in the side wall of the casing 10. A bore 63 in the other end of the shaft 57 is threaded to receive a screw bolt 56. The outer portion of the bore 63 and of the bolt 56 are correspondingly convergent, the tapered end of the shaft being split longitudinally in a manner such that the bolt wedges the split portions of the shaft against the sprocket spool and causes the shaft and sprocket spool to rotate together.

Mechanism is provided which operates automatically to lock the sprocket spool 43 upon completing one revolution and is manually operable to release the sprocket spool for further rotation. The mechanism, shown in locked position in Fig. 3 and in released position in Fig. 5, includes a cam plate 80 adjacent the end of the sprocket spool 43, an intermediate disk plate 81, an outer disk plate 82, and a ring washer 83, all keyed onto the shaft 57 and preferably fastened together in any suitable manner, for example, by welding to provide a unitary member revolvable by the shaft. A gear 95, positioned between the base plate 72 and the side wall of the housing 10, is also keyed onto the shaft 57.

A combination automatically locking and manually actuated release device operatively engages the cam and disk plate assembly mounted on the shaft 57. The locking and release device includes a plate 86 and a bifurcated plunger rod 87. The outer peripheral edge of the plate 82 is provided with a beveled slot 84 adapted to receive a correspondingly beveled cam member 85 projecting from the plate 86. The cam plate 80 has its peripheral edge stopping short of the edge of the plate 81 on the side adjacent the slot 84 and thereby provides a cam face operable in a manner hereinafter more particularly described. The plate 86 is tiltably mounted on the inner bifurcated end of the plunger rod 87 by means of a pin 92. The edge of the plate 86 opposite to the cam 85 provides a downwardly projecting arm 88 carrying a pin 89. The outer end of the plunger rod 87 projects through and is slidable in an aperture 90 in the casing 10. The inner bifurcated end of the rod 87 extends through and is slidable in an aperture 91 in the base plate 72. The aperture 91 is elongated to permit a swinging movement of the plate 86 on its pivot 92, and a leaf spring 93, operatively engaging the pin 89, tends to hold the lower diagonal edge of the plate 86 in contact with a flange 94 formed on the plunger rod 87. The spring 93 also tends to hold the extreme lower end of the plate 86 in contact with the side wall of the casing 10 thereby limiting the outward movement of the plunger rod 87.

Figure 5:
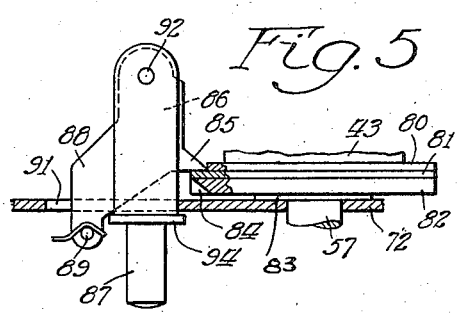
Fig. 5 is a view drawn to a larger scale of a film release and locking mechanism shown in assembled position in Fig. 3.

The locking and releasing device is shown in its outer-most position in Fig. 3 with the cam 85 in the slot 84, in which position the shaft 57 and sprocket spool 43 are locked against rotation. Upon movement of the locking device to the position shown in Fig. 5, the cam 85 rests on the inner exposed portion of the face of the plate 81. In this position of the cam 85 it is adapted to be moved over the plate 81 and thereby permit rotation of the shaft 57 and of the sprocket spool 43. Movement of the device from the locked position shown in Fig. 3 to the released position shown in Fig. 5 is accomplished by pushing on the projecting end of the rod 87 to move it inwardly. The inward movement of the rod 87 carries with it the plate 86 thereby causing the cam 85 to ride over the diagonal face of the slot 84. The plate 86 is thereby tilted to one side, the leaf spring 93 yielding sufficiently to permit the tilting movement. Upon completion of the inward movement of the plate 86 and the rod 87 the spring 93 swings the plate 86 back to its normal position relative to the rod and seats the cam 85 on the exposed portion of the inner face of the disk plate 81 with the end of the cam in engagement with the eccentric edge of the cam plate 80. In this position of the cam it is adapted to be moved over the exposed portion of the face of the plate 81 and permit the sprocket spool 43 to be rotated by winding the film 39 upon the reel 41. The resulting rotation of the sprocket spool 43 correspondingly rotates the shaft 57 as already described together with the assembly of plates 80, 81 and 82 carried by the shaft. Rotation of the cam plate 80 with the cam 85 positioned thereon forces the cam outwardly on its seat on the plate 81 and is completely unseated upon rotation of the sprocket spool 43 and the cam plate 80, through approximately 100°. The spring 93 then operates to move the unseated cam 85 to a position where its outer pointed edge presses against the peripheral edge of the disk 82. Rotation of the sprocket spool 43 and of the plates assembled on the shaft 57 through one complete revolution permits the cam 85 to again enter the slot 84 and lock the sprocket spool against rotation.

The number of successive exposures of the film 39 can be read from a graduated disk 99 operatively connected with the shaft 57. A shaft 97 suitably journalled in the base plate 72 and in the side wall of the housing 10 provides a mounting for the graduated disk 99, the latter being held in position on the shaft by a screw bolt 98. The disk 99 frictionally engages the shaft 97 in such a manner as to be rotated by the shaft and to permit the disk to be rotated manually about the shaft as desired.

The shaft 97 is actuated by a gear 96 in mesh with the gear 95 on the shaft 57. The gears 95 and 96 are respectively provided with 51 and 50 teeth and their respective diameters are also in the ratio of 51 to 50. One complete revolution of the sprocket spool 43 and of the shaft 57 actuates the gears 95 and 96 to rotate the shaft 97 and the disk 99 through one complete revolution and 1/50 of a second revolution. An arrow 100 on the housing 10 provides a pointer by means of which the number of completed rotative movements of the sprocket spool 43 and corresponding consecutive exposures of the film 39 may be read on the disk 99. Assuming the disk 99 is set at zero reading preliminary to the first film exposure, the arrow 100 will point to the unit reading on the disk 99 upon completion of the first film movement. The advancement of the film 39 for the second exposure by winding it on the reel 41 and the resulting rotation of the graduated disk 99 through 1=1/50 revolutions will leave the disk in a position wherein the arrow 100 points to the second disk graduation. Obviously each successive completed rotative movement of the sprocket spool 43 will be similarly indicated and totalized up to fifty successive exposures.

Figure 6:
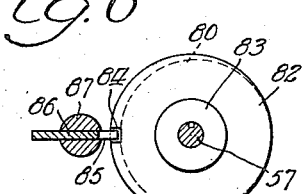
Fig. 6 is a view along the line 6—6 of Fig. 3 showing the locked position of the film release mechanism illustrated in released position in Fig. 5.
Figure 7:
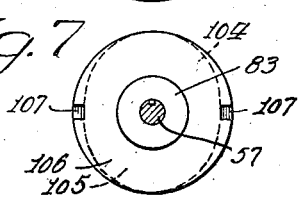
Fig. 7 illustrates a modified form of film release mechanism adapted for use in exposing contiguous areas of films in black and white photography.

The foregoing description illustrates the use of a one hundred fifty (150) inch length of film for color photography, wherein three inches of film are used for each exposure. In taking black-white pictures only one and one half inches of film is required for each exposure and in order that the film 39 may be advanced exactly 1½ inches, the cam and disk plate assembly shown in Figs. 3, 5 and 6, as mounted on the shaft 57, will be replaced by the assembly shown in Fig. 7. The assembly of plates shown in Fig. 7 consists of an inner cam plate 104 separated from an outer disk plate 106 by a disk plate 105. The disk plate 106 differs from the plate 82 in that it is provided with two beveled slots 107 accurately positioned in the peripheral edge on diametrically opposite sides. The cam plate 104 differs from the cam plate 82 in that its opposite edges terminate short of the adjacent peripheral edges of the disk plates to provide cam surfaces and leaving corresponding opposite crescent shaped surfaces of the plate 105 uncovered to provide a seat for the cam 85 adjacent each slot 107.

The operation of the automatic locking and manually actuated cam releasing mechanism is the same as that already described except that the sprocket spool 43 is locked thereby upon each rotation through 180° and thus limits the film movement to 1½ inches.

In using the camera for taking black and white pictures a graduated disk 99a, shown in Fig. 8, is substituted for the disk 99, and gears 95a and 96a, shown in Fig. 9, are respectively substituted for the gears 95 and 96. The disk 99a is preferably of the same size as the disk 99, but is drawn to a larger scale to more clearly illustrate the closely spaced graduations of which there are one hundred instead of fifty as provided on the disk 99. The gears 95a and 96a are respectively provided with one hundred one and fifty teeth and the diameters of the gears are respectively in the ratio of 101 to 50. Obviously, rotation of the gear 95a through 180° with the sprocket spool 43 will cause the gear 96a and disk 99a to rotate through one complete revolution and 1/100 of a second revolution and thereby indicate each successive advance movement of the film 39 through 1½ inches.

Thus it will be seen that I have provided novel means for exposing limited areas of the film to light coming from an object field in combination with improved means for successively advancing and locking the film automatically against further movement and improved manually operable release mechanism for permitting successive advancement of the film.

Having thus described my invention it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. The combination with a camera providing means for exposing a limited area of a film to light from an object field, of means for advancing the film to successively expose other areas thereof to said light, means preventing retraction of the film, a member rotatable by the advancing film, means connecting said member and film adapted to prevent movement of the film without correspondingly rotating the member, means automatically operable to lock said member against rotation in either direction upon completing a predetermined amount of rotation, means manually operable to release said locking means and to automatically hold said locking means in released position to permit further movement of the film and corresponding rotation of the member, said locking means operating automatically to stop the member upon its further rotation by said predetermined amount, and means operable by the rotation of the member to indicate the total number of said completed rotative movements thereof.

2. The combination with a camera providing means for exposing a limited longitudinal section of a film to light from an object field, of means for advancing the film to successively expose contiguous longitudinal sections thereof to said light, said means comprising spaced apart rotatable supply and winding reels so arranged that a section of the film connecting the reels is exposed to said light, means manually operable to rotate the winding reel in one direction to wind the film thereon and thereby advance the film, means preventing rotation of the winding spool in the opposite direction, a member rotatable by advance movement of the unwound portion of the film, means operatively connecting said member and film adapted to prevent movement of the film except by correspondingly rotating said member in exact accordance with said film movement, means automatically operable to lock said member against further rotation in either direction upon completion of a predetermined amount of rotation thereof, means manually operable to release said locking means and to automatically maintain said locking means in released position to permit further advancement of the film and corresponding rotation of the member, and means operable by the rotation of said member to indicate the total number of said completed rotative movements thereof.

3. The combination with a camera providing means for exposing a limited longitudinal section of a film to light from an object field, of means for advancing the film to successively expose contiguous longitudinal sections thereof to said light, said means comprising spaced apart rotatable supply and winding reels so arranged that a section of the film connecting the reels is exposed to said light, means manually operable to rotate the winding reel in one direction to wind the film thereon and thereby advance the film, means preventing rotation of the winding reel in the opposite direction, a member rotatable by movement of the unwound portion of the film, means operatively connecting said member and film adapted to prevent movement of the film except by correspondingly rotating the member in exact accordance with said film movement, means automatically operable to lock said member against further rotation upon completion of a predetermined amount of rotation thereof, means manually operable to release said locking means and to automatically maintain said locking means in released position to permit further advancement of the film and resulting rotation of the member by said predetermined amount, said locking means again operating automatically to stop the member upon its being further rotated by said predetermined amount, and means operable by the rotation of said member to indicate the total number of said completed rotative movements thereof.

4. The combination with a camera providing film carrying and actuating means, of a sprocket spool adapted to have a film wrapped in close fitting contact with a segment of its circumferential bounding surface, a plurality of radially projecting teeth arranged in equal spaced circumferential relation about the spool and each adapted to enter marginal spaced apart apertures in the film, a shaft rotatable by the spool, a disk rotatable by the shaft and providing a recess bounded by a cam surface, a plunger rod reciprocally movable adjacent said disk, a cam plate pivotally mounted on said rod and adapted to enter said recess and lock the disk against further rotation when the rod is in retracted position, resilient means adapted to hold said plate in said recess and yieldable to permit manual actuation of said rod and plate to a position wherein the plate is moved out of the recess, said resilient means operating to return the plunger rod to its initial position during further rotation of the disk and to move the plate into said recess upon one complete rotation of the disk.

5. The combination with a camera providing film carrying means, of a sprocket spool adapted to have a film wrapped in close fitting contact with a segment of its circumferential bounding surface, a plurality of radially projecting teeth arranged in equal spaced circumferential relation about said bounding surface and each adapted to enter marginal spaced apart apertures in the film, means manually operable to move the film in one direction and rotate the spool, a disk rotatable by the spool and providing a plurality of equally spaced recesses each bounded by a cam surface, a plunger rod reciprocally movable adjacent to said disk, a cam plate pivotally mounted on said rod and adapted to enter any of said recesses as they are respectively moved into contiguity to said plate and thereby lock the disk against further rotation when the rod is in retracted position, resilient means adapted to hold said plate in locking position in said slots and yieldable to permit manual actuation of said rod and plate to a position wherein the plate is released from locking engagement with the disk, said resilient means operating to return the rod to its original position during further rotation of the disk and to move the plate into the following recess upon its rotation into contiguity with the plate.

6. The combination with a camera providing film carrying means, of a sprocket spool adapted to have a film wrapped in close fitting contact with a segment of its circumferential bounding surface, a plurality of radially projecting teeth arranged in equal spaced circumferential relation about said bounding surface and each adapted to enter marginal spaced apart apertures in the film, means manually operable to move the film in one direction and thereby rotate the spool, a disk rotatable by and at the same rate as said spool, said disk providing a plurality of equally spaced recesses in its peripheral edge each bound by a cam surface, a plunger rod reciprocally movable adjacent to said disk, a cam plate pivotally mounted on said rod and adapted when the rod is retracted to enter any of said recesses as they are respectively moved into contiguity to said plate and thereby lock the disk against further rotation, resilient means adapted to hold said plate in locking position in said slots and yieldable to permit manual actuation of said rod and plate to a position wherein the plate is released from locking engagement with the disk, said resilient means operating to return the rod to its original position following further rotation of the disk and to move the plate into the following recess upon its rotation into contiguity with the plate, and means operable by rotation of the spool to indicate the total number of said completed rotative movements of the spool.

7. In a camera, means operable to advance a film, a rotatable sprocket spool, means automatically operable to lock the spool against rotative movement in either direction at the end of each successive rotation thereof by a predetermined amount, means manually operable to release the locking means from operative engagement with the spool and to automatically hold the locking means in released position to permit further advancement of the film, means operatively connecting the spool with the film in a manner whereby advancement of the film rotates the spool in exact accordance with the advancement of the film and locking of the spool prevents further movement of the film, means operable to register the total number of completed rotative movements of the spool, said registering means comprising a graduated disk, a stationary pointer providing an indicator for the disk, and mechanism operatively connecting said spool and disk, said mechanism operable to rotate the disk to increase the indicated reading by one unit for each completed rotative movement of the spool.

8. In a camera, means operable to advance a film, a rotatable sprocket spool, means automatically operable to lock the spool against rotation in either direction upon rotation thereof by a predetermined amount, means manually operable to release the locking means from operative engagement with the spool and to automatically maintain the locking means in released position to permit rotation of the spool, means operatively connecting the spool with the film in a manner whereby advancement of the film rotates the spool in exact accordance with the advancement of the film and locking of the spool prevents further movement of the film, means operable to register the total number of completed rotative movements of the spool by said amount, said registering means comprising a graduated disk, a stationary pointer providing an indicator for the disk, a shaft operable to revolve the disk relative to the pointer, a pair of meshing gears one mounted on said shaft and the other rotatable by and with the spool, said gears operable by each completed rotative movement of the spool to revolve the disk and to increase by one unit the indicated reading of the pointer.

9. In a camera, means operable to advance a film, a rotatable sprocket spool, means automatically operable to lock the spool against rotation in either direction for each successive rotation thereof by a predetermined amount, means manually operable to release the locking means from operative engagement with the spool and to automatically maintain the locking means in released position to permit rotation of the spool, means operatively connecting the spool with the film in a manner whereby advancement of the film rotates the spool in exact accordance with the advancement of the film and locking of the spool prevents further movement of the film, means operable to register the total number of completed rotative movements of the spool, said registering means comprising a graduated disk, a stationary pointer providing an indicator for the disk, a shaft operable to revolve the disk relative to the pointer, a pair of meshing gears one mounted on said shaft and the other rotatable by and with the spool, said gears operable by each completed rotative movement of the spool to revolve the disk through one complete revolution and a fractional revolution corresponding to one graduation of the disk.

CHARLES L. FITZ.